(12) United States Patent
Song et al.

(10) Patent No.: US 10,401,056 B2
(45) Date of Patent: Sep. 3, 2019

(54) HYDROTHERMAL GEOTHERMAL DEVELOPMENT METHOD OF MULTILATERAL WELL CLOSED CIRCULATION

(71) Applicant: China University of Petroleum-Beijing, Beijing (CN)

(72) Inventors: Xianzhi Song, Beijing (CN); Gensheng Li, Beijing (CN); Zhongwei Huang, Beijing (CN); Shouceng Tian, Beijing (CN); Haizhu Wang, Beijing (CN); Huaizhong Shi, Beijing (CN); Mao Sheng, Beijing (CN); Yiqun Zhang, Beijing (CN); Jingbin Li, Beijing (CN); Yu Shi, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 127 days.

(21) Appl. No.: 15/869,910

(22) Filed: Jan. 12, 2018

(65) Prior Publication Data
US 2018/0283735 A1 Oct. 4, 2018

(30) Foreign Application Priority Data

Mar. 30, 2017 (CN) .......................... 2017 1 0200768

(51) Int. Cl.
*F24T 10/20* (2018.01)
*F24T 10/17* (2018.01)
(Continued)

(52) U.S. Cl.
CPC .......... *F24T 10/17* (2018.05); *E21B 41/0035* (2013.01); *E21B 43/305* (2013.01);
(Continued)

(58) Field of Classification Search
CPC ......... F24T 10/17; F24T 10/20; E21B 43/305; E21B 47/04; E21B 49/00; E21B 43/088; E21B 33/14; E21B 7/04
See application file for complete search history.

(56) References Cited

U.S. PATENT DOCUMENTS 8,167,043 B2 * 5/2012 Willberg .................. C09K 8/42
166/280.1
8,646,529 B2 * 2/2014 Clark ...................... E21B 43/14
166/281
(Continued)

FOREIGN PATENT DOCUMENTS

CN 101864937 A 10/2010
CN 102536174 A 7/2012
(Continued)

OTHER PUBLICATIONS

Second Office Action in corresponding Chinese Patent Application No. 201710200768.7 dated Feb. 3, 2019.
(Continued)

*Primary Examiner* — Mark A Laurenzi
*Assistant Examiner* — Shafiq Mian
(74) *Attorney, Agent, or Firm* — Loza & Loza, LLP; Michael F. Fedrick

(57) ABSTRACT

The present disclosure provides a hydrothermal geothermal development method of multilateral well closed circulation, comprises the steps of: dividing a geothermal reservoir into single layers according to geothermal reservoir geological conditions, wherein an upper single layer with a lower water temperature and a higher permeability is taken as a recharge layer, and a lower single layer with a higher water temperature is taken as a production layer; tripping a production casing, and injecting cement for well cementation; performing casing lateral windowing in a vertical hole corresponding to the recharge layer, and drilling several branch radial
(Continued)

horizontal holes into the recharge layer; performing casing lateral windowing in the vertical hole corresponding to the production layer, and drilling several branch radial horizontal holes into the production layer; tripping a guiding pipe into the production casing of the vertical hole, with a depth thereof reaching a well section between the recharge layer and the production layer; tripping a packer at a guiding shoe to isolate the guiding pipe and an annulus of the casing from each other, so as to prevent geothermal fluid of the recharge layer and the production layer from being communicated with each other in the vertical hole.

10 Claims, 2 Drawing Sheets

(51) Int. Cl.
| | | |
|---|---|---|
| *E21B 43/30* | (2006.01) | |
| *E21B 41/00* | (2006.01) | |
| *E21B 49/00* | (2006.01) | |
| *E21B 43/08* | (2006.01) | |
| *E21B 7/04* | (2006.01) | |
| *E21B 47/04* | (2012.01) | |
| *E21B 33/14* | (2006.01) | |
| *F24T 10/00* | (2018.01) | |

(52) U.S. Cl.
CPC ............... *F24T 10/20* (2018.05); *E21B 7/04* (2013.01); *E21B 33/14* (2013.01); *E21B 43/088* (2013.01); *E21B 47/04* (2013.01); *E21B 49/00* (2013.01); *F24T 2010/53* (2018.05); *Y02E 10/125* (2013.01)

(56) References Cited

U.S. PATENT DOCUMENTS

| | | | |
|---|---|---|---|
| 8,726,991 B2* | 5/2014 | Boney | C09K 8/68 166/281 |
| 8,887,803 B2* | 11/2014 | East, Jr. | E21B 34/14 166/250.01 |
| 9,366,124 B2* | 6/2016 | Brannon | E21B 43/261 |
| 2005/0222852 A1* | 10/2005 | Craig | E21B 49/008 166/305.1 |
| 2007/0272407 A1* | 11/2007 | Lehman | E21B 43/26 166/250.1 |
| 2013/0283791 A1* | 10/2013 | Riley | F03G 7/04 60/641.2 |

FOREIGN PATENT DOCUMENTS

| | | |
|---|---|---|
| CN | 103362442 A | 10/2013 |
| CN | 104633996 A | 5/2015 |
| CN | 104653148 A | 5/2015 |
| CN | 105804654 A | 7/2016 |
| CN | 105840146 A | 8/2016 |

OTHER PUBLICATIONS

Search Report in corresponding Chinese Patent Application No. 201710200768.7 dated Sep. 19, 2018.
Office Action in corresponding Chinese Patent Application No. 201710200768.7 dated Sep. 19, 2018.

* cited by examiner

HYDROTHERMAL GEOTHERMAL DEVELOPMENT METHOD OF MULTILATERAL WELL CLOSED CIRCULATION

TECHNICAL FIELD

The present disclosure relates to the field of energy exploitation, and particularly, to a geothermal exploitation method, i.e., a hydrothermal geothermal development method of multilateral well closed circulation.

BACKGROUND ART

The geothermal energy is a renewable clean energy which is green, low-carbon, and recyclable. With the advantages of being reserved in a large scale, widely distributed, clean and environment-friendly, stable and reliable, etc., the geothermal energy is a clean energy which is practical, feasible and competitive. China has rich geothermal resources, and as shown in the data publicized by the Ministry of Land and Resources in 2015, the quantity of geothermal resources worldwide within a burial depth of 5 km is about 4,900 trillion tons of standard coals, and about ⅙ of them are reserved in China. The reserve of the middle-deep-stratum geothermal resources with a burial depth of 200 to 4,000 m is about 1,370 billion tons of standard coals, and the reserve of the dry-hot-rock geothermal resources with a burial depth of 3 to 10 km reaches 860 trillion tons of standard coals; thus the development and utilization potential is enormous. Nonetheless, in China the proved geothermal resources are mainly hydrothermal, and the large-scale high-temperature geothermal fields are few; the medium-low temperature geothermal system has complex geothermal reservoir conditions, a low water temperature, a small flow rate, and a poor quality; with the current geothermal development modes, the production is low, the heat recovery power is limited, and the recharging is difficult; thus the development and utilization of the hydrothermal geothermal resources in China are greatly restricted.

Currently, there are mainly two types of development modes for hydrothermal geothermal fields. The first type is to recover heat without water, including using a buried pipe that recovers heat through heat conduction, and using a single-well downhole heat exchanger that performs a convective heat exchange. The second type is to perform geothermal exploitation by directly exploiting the geothermal fluid.

The mode that recovers heat without water is mainly adopted for the shallow-stratum medium-low temperature geothermal development without exploiting the geothermal fluid, which avoids the difficulty of recharging, saves the procedures such as de-gritting and anticorrosion, and achieves the advantages such as environment protection and simple process. However, the heat recovery power is limited, and the exploited geothermal energy can only be used for the direct application modes such as the heat supply, rather than the geothermal energy power generation. Thus, the energy utilization rate is low, and this mode is not suitable for the deep-stratum high-temperature geothermal development.

Directly exploiting a geothermal fluid is a geothermal development method with the highest heat recovery power. Nevertheless, in China, there are a large number of geothermal reservoirs of complex geological conditions, and their permeabilities are low; thus the method has a low production per well, and the recharging is difficult; therefore, in some geothermal fields, the recharge rate is low and the underground water level drops. If a reservoir reformation is performed with a hydraulic fracturing method, the geothermal development cost will be obviously increases, and the underground water resources will be polluted.

In conclusion, the prior art has the following problems: regarding the complex geothermal reservoir conditions in China, the current geothermal development modes have a low production per well, and the recharging is difficult.

SUMMARY OF THE DISCLOSURE

The present disclosure provides a hydrothermal geothermal development method of multilateral well closed circulation, so as to solve the problems that regarding the complex geothermal reservoir conditions in China, the current geothermal development modes have a low production per well, and the recharging is difficult.

Thus, the present disclosure provides a hydrothermal geothermal development method of multilateral well closed circulation, comprising the steps of:

(1) dividing a geothermal reservoir into single layers of different geological conditions according to geothermal reservoir geological conditions, wherein an upper single layer with a lower water temperature and a higher permeability is taken as a recharge layer, and a lower single layer with a higher water temperature is taken as a production layer;

(2) determining a geothermal reservoir burial depth, designing a drilling engineering scheme, and drilling a vertical hole of a branch hole to reach a reservoir bottom;

(3) tripping a production casing into the vertical hole, and injecting cement for well cementation;

(4) performing casing lateral windowing in the vertical hole corresponding to the recharge layer, drilling at least one first branch radial horizontal hole into the recharge layer to form a recharge branch hole, and tripping a water filtering pipe of the recharge layer into the recharge branch hole for well completion;

(5) performing casing lateral windowing in the vertical hole corresponding to the production layer, drilling at least one second branch radial horizontal hole into the production layer to form a production branch hole, and tripping a water filtering pipe of the production layer into the production branch hole for well completion;

(6) tripping a guiding pipe into the production casing of the vertical hole, with a depth thereof reaching a well section between the recharge layer and the production layer;

(7) communicating the guiding pipe with the production branch hole, so that the guiding pipe is communicated with an annulus of the casing and the recharge branch hole to form a geothermal fluid circulation passageway;

(8) tripping a packer at a guiding shoe of the guiding pipe to isolate the guiding pipe and the annulus of the casing from each other, so as to prevent geothermal fluid of the recharge layer and the production layer from being communicated with each other in the vertical hole;

(9) under a pressure difference between a stratum and the production branch hole, causing the geothermal fluid of the production layer to flow into the production branch hole, converge into the vertical hole and be exploited to the ground via the guiding pipe;

(10) utilizing heat of the exploited high-temperature geothermal fluid on the ground, so that the high-temperature geothermal fluid releases heat and is changed into low-temperature geothermal fluid, and re-injecting cooled low-temperature geothermal fluid into the recharge branch hole from the guiding pipe and the annulus of the casing using a high-pressure pump, so that the cooled low-temperature geothermal fluid flows into the recharge layer;

(11) under the gravity and an injection-production pressure difference, causing the low-temperature geothermal fluid entering the recharge layer to flow from the upper recharge layer to the lower production layer, then flow into the production branch hole after sufficiently exchanging heat with the geothermal reservoir during seepage, and exploited to the ground via the guiding pipe.

Further, a plurality of the first branch radial horizontal holes are drilled into the recharge reservoir, and a plurality of the second branch radial horizontal holes are drilled into the production layer.

Further, the number of the recharge layers is plural.

Further, the number of the production layers is plural.

Further, the number of the recharge layers is 2 to 4, and the number of the production layers is 2 to 4.

Further, both the water filtering pipe of the recharge layer and the water filtering pipe of the production layer are strainer-packing and wires-wrapping drilled water filtering pipes.

Further, each of the first branch radial branch holes has a length of 100 to 500 m.

Further, each of the second branch radial branch holes has a length of 100 to 500 m.

Further, well cementation for a well section of the production layer is performed using high-thermal conductivity cement paste with a thermal conductivity coefficient more than 30 W/m·K.

Further, 4 to 8 first branch radial branch holes can be drilled into each of the recharge layers, and 4 to 8 second branch radial branch holes can be drilled into each of the production layers.

As compared with the prior art, the technical solutions provided by the present disclosure mainly have the following advantages and characteristics:

(1) The heat recovery ratio is high, and the recharge capability is strong. Through the multilateral well technique, a plurality of horizontal branch holes may be radially drilled into one or more positions of a stratum, so as to realize "one well multi-layer and one layer multi-hole" in the geothermal reservoir, expand the control volume and the aerial drainage area for the reservoir, improve the flow conductivity of the reservoir, and improve the production per well and the recharge capability, thereby increasing the heat recovery efficiency.

(2) The cost of the geothermal exploitation is low. Through the multi-branch hole technique, a development mode of pumping and recharging well (PRW) can be formed, thus the geothermal fluid can be recharged and exploited in the same well, and it is unnecessary to drill a recharge well and a development well, respectively. The drilling cost of a multi-branch well is far less than that of an ordinary well with the same number of holes, thus the multilateral well technique can be used to achieve an efficient low-cost development of the hydrothermal reservoir.

(3) The upper portion of the reservoir is taken as the recharge layer, and the lower portion thereof is taken as the production layer. The upper portion of the reservoir has a lower pressure and the recharge difficulty is reduced, while the lower portion of the reservoir has a higher temperature, and the geothermal resources of the high-temperature layer are developed and utilized sufficiently. The geothermal fluid flows from the upper portion of the reservoir to the lower portion thereof, and the gravitational potential energy is also sufficiently utilized, which increases the driving force of the self-circulation.

REFERENCE NUMERALS

1: (hydrothermal) geothermal reservoir; 2: recharge (single) layer; 3: production (single) layer; 4: vertical well primarily-spudded section; 5: surface casing; 6: ordinary cement paste (conventional petroleum drilling cement paste); 7: vertical well secondarily-spudded section; 8: upper impermeable layer; 9: production casing; 10: highly thermal conductive cement paste; 11: recharge branch hole (first branch radial horizontal hole); 12: water filtering pipe; 13: production branch hole (second branch radial horizontal hole); 14; guiding pipe; 15: annulus; 16: guiding shoe; 17: packer; 18: high-pressure pump; 19: heat exchange device; 20: lower impermeable layer.

DETAILED DESCRIPTION OF THE PREFERRED EMBODIMENTS

In order to more clearly understand the technical features, the objectives and the effects of the present disclosure, the present disclosure is now described with reference to the drawings.

Figure 1:
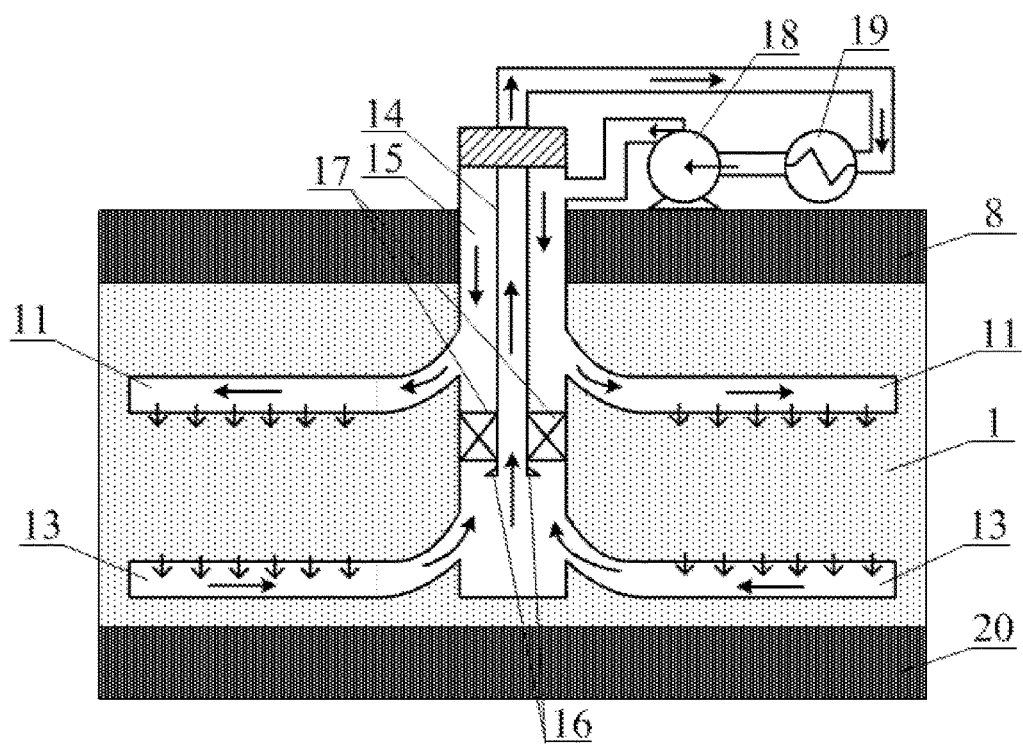
FIG. 1 illustrates a schematic diagram of a working principle of a hydrothermal geothermal development method of multilateral well closed circulation in the present disclosure.
Figure 2:
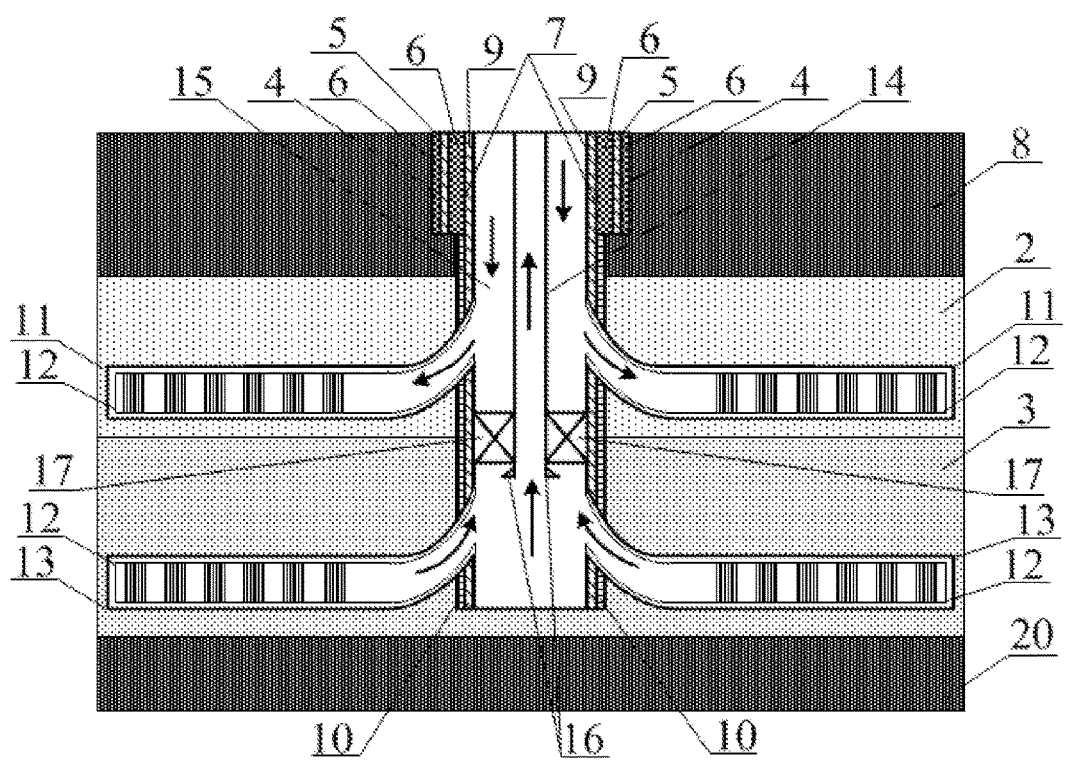
FIG. 2 illustrates a schematic diagram of a structure of a downhole system used by a hydrothermal geothermal development method of multilateral well closed circulation in the present disclosure.

As illustrated in FIGS. 1 and 2, a hydrothermal geothermal development method of multilateral well closed circulation in the present invention comprises the steps of:

(1) dividing a geothermal reservoir 1 into single layers of different geological conditions according to geothermal reservoir geological conditions, wherein an upper single layer with a lower water temperature and a higher permeability is taken as a recharge layer 2, and a lower single layer with a higher water temperature is taken as a production layer 3;

(2) determining a geothermal reservoir burial depth, designing a drilling engineering scheme, and drilling a vertical hole of a branch hole to reach a reservoir bottom;

(3) tripping a production casing 9 into the vertical hole, and injecting cement for well cementation;

(4) performing casing lateral windowing in the vertical hole corresponding to the recharge layer, drilling at least one first branch radial horizontal hole 11 into the recharge layer to form a recharge branch hole, and tripping a water filtering pipe 12 of the recharge layer into the recharge branch hole for well completion;

(5) performing casing lateral windowing in the vertical hole corresponding to the production layer, drilling at least one second branch radial horizontal hole 13 into the production layer to form a production branch hole, and tripping a water filtering pipe 12 of the production layer into the production branch hole for well completion;

(6) tripping a guiding pipe 14 into the production casing 9 of the vertical hole, with a depth thereof reaching a well section between the recharge layer 2 and the production layer 3;

(7) communicating the guiding pipe 14 with the production branch hole, so that the guiding pipe is communicated with an annulus of the casing and the recharge branch hole to form a geothermal fluid circulation passageway;

(8) tripping a packer 17 at a guiding shoe 16 of the guiding pipe to isolate the guiding pipe and the annulus 15 of the casing from each other, so as to prevent geothermal fluid of the recharge layer and the production layer from being communicated with each other in the vertical hole;

(9) under a pressure difference between a stratum and the production branch hole, causing the geothermal fluid of the production layer to flow into the production branch hole, converge into the vertical hole and be exploited to the ground via the guiding pipe 14;

(10) utilizing heat of the exploited high-temperature geothermal fluid on the ground, so that the high-temperature geothermal fluid releases heat and is changed into low-temperature geothermal fluid, and re-injecting cooled low-temperature geothermal fluid into the recharge branch hole from the guiding pipe and the annulus of the casing using a high-pressure pump 18, so that the cooled low-temperature geothermal fluid flows into the recharge layer;

(11) under the gravity and an injection-production pressure difference, causing the low-temperature geothermal fluid entering the recharge layer to flow from the upper recharge layer to the lower production layer, then flow into the production branch hole after sufficiently exchanging heat with the geothermal reservoir during seepage, and exploited to the ground via the guiding pipe.

A plurality of the first branch radial horizontal holes are drilled into the recharge reservoir, and a plurality of the second branch radial horizontal holes are drilled into the production layer; the diameter, the length, the quantity and the interval of the branch hole shall be determined based on physical properties such as the temperature, the pressure, the permeability and the water content of the reservoir, so as to expand the control volume of the borehole for the reservoir, improve the seepage capability of the reservoir, and increase the injection capability and the production of the borehole as much as possible.

Further, the number of the recharge layers is plural, so as to expand the control volume of the recharge branch hole for the reservoir as much as possible.

Further, the number of the production layers is plural, so as to expand the control volume of the production branch hole for the reservoir as much as possible.

Further, the number of the recharge layers is 2 to 4, and the number of the production layers is 2 to 4, so as to expand the control volumes of the recharge branch hole and the production branch hole for the reservoir as much as possible.

Further, both the water filtering pipe of the recharge layer and the water filtering pipe of the production layer are strainer-packing and wires-wrapping drilled water filtering pipes, which are selected to filter impurities in the geothermal fluid, and prevent solid particles from abrading and jamming the pipeline and the ground equipment.

Further, 4 to 8 first branch radial branch holes may be drilled into each of the recharge layers, 4 to 8 second branch radial branch holes may be drilled into each of the production layers, and either each of the first branch radial branch holes or each of the second branch radial branch holes has a length of 100 to 500 m. The diameter, the length, the quantity and the interval of the branch hole shall be determined based on physical properties such as the temperature, the pressure, the permeability and the water content of the reservoir, so as to expand the control volume of the borehole for the reservoir, improve the seepage capability of the reservoir, and increase the injection capability and the production of the borehole as much as possible.

Further, the well cementation for a well section above the recharge layer is performed using ordinary cement paste (conventional petroleum drilling cement paste). The well cementation for a well section of the production layer is performed using high-thermal conductivity cement paste (the thermal conductivity coefficient is more than 30 W/(m·K)), which is helpful to promote the heat exchange between the exploited geothermal fluid with surrounding stratums.

Further, a guiding pipe (the thermal conductivity coefficient is less than 0.5 W/(m·K)) with a good heat insulation effect may be used, which is helpful to reduce the heat exchange between the high-temperature geothermal fluid exploited in the guiding pipe and the low-temperature fluid re-injected in the annulus, so as to achieve a heat insulation function.

Further, the circulation flow rate of the system and the pump pressure shall be determined based on physical properties such as the temperature, the pressure, the permeability and the water content of the reservoir, so as to avoid the rapid drop of the reservoir temperature and the short geothermal reservoir development life caused by a very large flow rate, and prevent a very low production and heat recovery power caused by a very small flow rate.

Next, a more specific embodiment is introduced as follows with reference to FIGS. 1 and 2:

(1) determining a (hydrothermal) geothermal reservoir 1 (between an upper impervious layer 8 and a lower impervious layer 20), and dividing the geothermal reservoir 1 into an upper recharge (single) layer 2 and a lower production (single) layer 3 according to block geological data;

(2) designing a wellbore configuration according to block geological data, drilling a vertical well primarily-spudded section 4 of a multi-branch hole using a drill bit, tripping a surface casing 5, and using ordinary cement paste (conventional petroleum drilling cement paste) 6 for well cementation;

(3) drilling a vertical well secondarily-spudded section 7 using a drill bit of a size one level below, so that the drilling penetrates the upper impervious layer 8 and the recharge (single) layer 2 to reach 5 to 10 m in a bottom of the production (single) layer 3;

(4) tripping a production casing 9, performing well cementation for a well section between the recharge (single) layer 2 and the production (single) layer 3 using highly thermal conductive cement paste 10, and performing well cementation for a well section above the recharge (single) layer 2 using ordinary cement paste(conventional petroleum drilling cement paste) 6;

(5) performing casing lateral windowing at an upper portion of a vertical hole corresponding to the recharge (single) layers; drilling several recharge branch radial horizontal holes 11 in each of the recharge (single) layers, wherein the number of the horizontal holes is determined by the recharge (single) layers and the penetration capability, usually 4 to 8, and the length of a horizontal section is 100 to 500 m; tripping strainer-packing and wires-wrapping drilled water filtering pipes 12 for well completion;

(6) performing casing lateral windowing at a lower portion of a vertical hole corresponding to the production (single) layers; drilling several production branch radial horizontal holes 13 in each of the production (single) layers, wherein the number of the horizontal holes is determined by the recharge single layers and the penetration capability, usually 4 to 8, and the length of a horizontal section is 100 to 500 m; tripping strainer-packing and wires-wrapping drilled water filtering pipes 12 for well completion;

(7) tripping a guiding pipe with a good heat insulation effect into the vertical hole to reach a well section between the recharge branch (radial horizontal) hole 11 and the production branch (radial horizontal) hole 13;

(8) communicating the guiding pipe 14 with the production branch (radial horizontal) hole 13, and communicating the guiding pipe 14 with an annulus 15 of the production casing 9 and the recharge branch (radial horizontal) hole 11, to form a geothermal fluid circulation passageway;

(9) tripping a packer 17 at a guiding shoe 16 to isolate the guiding pipe 14 and the annulus 15 of the production casing 9 from each other, so as to prevent geothermal fluid in the recharge branch (radial horizontal) hole 11 and the production branch (radial horizontal) hole 13 from being communicated with each other in the vertical hole;

(10) injecting low-temperature fluid into the guiding pipe 14 and the annulus 15 of the production casing 9 on the ground using a high-pressure pump 18, so that the low-temperature fluid flows into the recharge branch (radial horizontal) hole 11, and enters the recharge (single) layer 2 to sufficiently exchange heat with the hydrothermal geothermal reservoir 1 to obtain high-temperature fluid;

(11) under a pressure difference between the hydrothermal geothermal reservoir 1 and the production branch (radial horizontal) hole 13, causing the high-temperature fluid to flow into the production branch (radial horizontal) hole 13, converge into the vertical hole and be exploited to the ground via the guiding pipe 14;

(12) utilizing heat of exploited high-temperature geothermal fluid on the ground via a heat exchange device 19, and injecting cooled fluid into the recharge branch (radial horizontal) hole 11 using a high-pressure pump 18 from the guiding pipe 14 and the annulus 15 of the production casing 9, so that the cooled fluid flows into the hydrothermal geothermal reservoir 1 to complete a fluid circulation heat exchange.

The present disclosure introduces the multilateral well technique into the hydrothermal geothermal development, which solves the problems that regarding the complex geothermal reservoir conditions in China, the current geothermal development modes have a low production per well, and the recharging is difficult, thereby achieving an efficient low-cost geothermal development for single wells, increasing the heat recovery ratio of the geothermal reservoir as much as possible, and promoting the sustainable development of the geothermal resources in China.

The above descriptions are just schematic specific embodiments of the present disclosure, rather than limitations to the present disclosure. The constituent parts of the present disclosure can be combined with each other under the condition that they do not conflict with each other. Any equivalent change and amendment made by a person skilled in the art without deviating from the conception and principle of the present disclosure shall fall within the protection scope of the present disclosure.

The invention claimed is:

1. A hydrothermal geothermal development method of multilateral well closed circulation, comprises the steps of:
   (1) dividing a geothermal reservoir into single layers of different geological conditions according to geothermal reservoir geological conditions, wherein an upper single layer with a lower water temperature and a higher permeability is taken as a recharge layer, and a lower single layer with a higher water temperature is taken as a production layer;
   (2) determining a geothermal reservoir burial depth, designing a drilling engineering scheme, and drilling a vertical hole of a branch hole to reach a reservoir bottom;
   (3) tripping a production casing into the vertical hole, and injecting cement for well cementation;
   (4) performing casing lateral windowing in the vertical hole corresponding to the recharge layer, drilling at least one first branch radial horizontal hole into the recharge layer to form a recharge branch hole, and tripping a water filtering pipe of the recharge layer into the recharge branch hole for well completion;
   (5) performing casing lateral windowing in the vertical hole corresponding to the production layer, drilling at least one second branch radial horizontal hole into the production layer to form a production branch hole, and tripping a water filtering pipe of the production layer into the production branch hole for well completion;
   (6) tripping a guiding pipe into the production casing of the vertical hole, with a depth thereof reaching a well section between the recharge layer and the production layer;
   (7) communicating the guiding pipe with the production branch hole, so that the guiding pipe is communicated with an annulus of the casing and the recharge branch hole to form a geothermal fluid circulation passageway;
   (8) tripping a packer at a guiding shoe of the guiding pipe to isolate the guiding pipe and the annulus of the casing from each other, so as to prevent the recharge layer from being communicated with geothermal fluid of the production layer in the vertical hole;
   (9) under a pressure difference between a stratum and the production branch hole, causing the geothermal fluid of the production layer to flow into the production branch hole, converge into the vertical hole and be exploited to the ground via the guiding pipe;
   (10) utilizing heat of the exploited high-temperature geothermal fluid on the ground, so that the high-temperature geothermal fluid releases heat and is changed into low-temperature geothermal fluid, and re-injecting cooled low-temperature geothermal fluid into the recharge branch hole from the guiding pipe and the annulus of the casing using a high-pressure pump, so that the cooled low-temperature geothermal fluid flows into the recharge layer;
   (11) under the gravity and an injection-production pressure difference, causing the low-temperature geothermal fluid entering the recharge layer to flow from the upper recharge layer to the lower production layer, then flow into the production branch hole after sufficiently exchanging heat with the geothermal reservoir during seepage, and exploited to the ground via the guiding pipe.

2. The hydrothermal geothermal development method of multilateral well closed circulation according to claim 1, wherein a plurality of the first branch radial horizontal holes are drilled into the recharge reservoir, and a plurality of the second branch radial horizontal holes are drilled into the production layer.

3. The hydrothermal geothermal development method of multilateral well closed circulation according to claim 1, wherein the number of the recharge layers is plural.

4. The hydrothermal geothermal development method of multilateral well closed circulation according to claim 3, wherein the number of the production layers is plural.

5. The hydrothermal geothermal development method of multilateral well closed circulation according to claim 4, wherein the number of the recharge layers is 2 to 4, and the number of the production layers is 2 to 4.

6. The hydrothermal geothermal development method of multilateral well closed circulation according to claim 1, wherein both the water filtering pipe of the recharge layer and the water filtering pipe of the production layer both strainer-packing and wires-wrapping drilled water filtering pipes.

7. The hydrothermal geothermal development method of multilateral well closed circulation according to claim 2, wherein each of the first branch radial branch holes has a length of 100 to 500 m.

8. The hydrothermal geothermal development method of multilateral well closed circulation according to claim 2, wherein each of the second branch radial branch holes has a length of 100 to 500 m.

9. The hydrothermal geothermal development method of multilateral well closed circulation according to claim 1, wherein well cementation for a well section of the production layer is performed using high-thermal conductivity cement paste with a thermal conductivity coefficient more than 30 W/m·K.

10. The hydrothermal geothermal development method of multilateral well closed circulation according to claim 4, wherein 4 to 8 first branch radial branch holes can be drilled into each of the recharge layers, and 4 to 8 second branch radial branch holes can be drilled into each of the production layers.

* * * * *